United States Patent
Farnsworth et al.

(10) Patent No.: US 12,416,966 B1
(45) Date of Patent: Sep. 16, 2025

(54) AUTOMATIC PERIPHERAL DEVICE DISCONNECTION

(71) Applicant: Triad National Security, LLC, Los Alamos, NM (US)

(72) Inventors: Conrad Jackson Farnsworth, Los Alamos, NM (US); Charles H. Mielke, Los Alamos, NM (US); Remington Stanley Bullis, Los Alamos, NM (US); Robert M. Broilo, Los Alamos, NM (US)

(73) Assignee: Triad National Security, LLC, Los Alamos, TX (US)

( * ) Notice: Subject to any disclaimer, the term of this patent is extended or adjusted under 35 U.S.C. 154(b) by 56 days.

(21) Appl. No.: 18/471,075

(22) Filed: Sep. 20, 2023

Related U.S. Application Data

(60) Provisional application No. 63/408,294, filed on Sep. 20, 2022.

(51) Int. Cl.
| | | |
|---|---|---|
| *G06F 1/00* | (2006.01) | |
| *G06F 1/3234* | (2019.01) | |
| *G06F 13/10* | (2006.01) | |
| *G06F 1/3203* | (2019.01) | |

(52) U.S. Cl.
CPC ............. *G06F 1/325* (2013.01); *G06F 13/10* (2013.01); *G06F 1/3203* (2013.01)

(58) Field of Classification Search
CPC .................................. G06F 1/325; G06F 13/10
USPC ........................................................ 713/320
See application file for complete search history.

(56) References Cited

U.S. PATENT DOCUMENTS

| | | | | |
|---|---|---|---|---|
| 5,781,783 A | * | 7/1998 | Gunther | G06F 1/3287 713/320 |
| 2003/0188205 A1 | * | 10/2003 | Mylly | G06F 1/266 713/300 |
| 2007/0005997 A1 | * | 1/2007 | Kardach | G06F 1/325 713/300 |
| 2007/0085596 A1 | * | 4/2007 | Ito | H03K 19/00384 327/534 |
| 2007/0143640 A1 | * | 6/2007 | Simeral | G06F 1/28 713/320 |
| 2008/0100272 A1 | * | 5/2008 | Yoshio | G05F 1/56 323/303 |
| 2008/0114998 A1 | * | 5/2008 | Ferentz | H04L 12/12 713/324 |

(Continued)

*Primary Examiner* — Volvick Derose
(74) *Attorney, Agent, or Firm* — ALSTON & BIRD LLP

(57) ABSTRACT

Embodiments provide for automatic disconnection of a peripheral device when a power consumption level of the peripheral device drops below a power consumption cutoff threshold, signifying that the peripheral device is no longer active. In embodiments, an example automatic peripheral device disconnect apparatus includes a first input/output connection, a second input/output connection, first circuitry configured to detect power consumption by a peripheral device connected to the first input/output connection, and second circuitry configured to disable power provided from a computing device connected to the second input/output connection to the peripheral device connected to the first input/output power when a detected power consumption by the peripheral device meets or drops below a cutoff threshold associated with the peripheral device.

20 Claims, 10 Drawing Sheets

(56) References Cited

U.S. PATENT DOCUMENTS

| | | | | |
|---|---|---|---|---|
| 2008/0126589 A1* | 5/2008 | Husain | ............... | G06F 3/023 |
| | | | | 710/14 |
| 2008/0162952 A1* | 7/2008 | Landers | ............ | G06F 1/3215 |
| | | | | 713/300 |
| 2009/0144484 A1* | 6/2009 | Sukegawa | ........ | G06F 1/3293 |
| | | | | 711/E12.001 |
| 2011/0234185 A1* | 9/2011 | Nagase | ............ | H03K 17/0822 |
| | | | | 323/277 |
| 2012/0102352 A1* | 4/2012 | Kim | ............... | G06F 1/263 |
| | | | | 713/340 |
| 2012/0235658 A1* | 9/2012 | Liu | ............... | H02M 3/33507 |
| | | | | 323/282 |
| 2018/0150121 A1* | 5/2018 | Basterash | ........ | H02J 7/0042 |
| 2021/0349518 A1* | 11/2021 | Cueva | ............ | G06F 1/3228 |
| 2024/0393858 A1* | 11/2024 | Dai | ............... | G06F 1/266 |

* cited by examiner

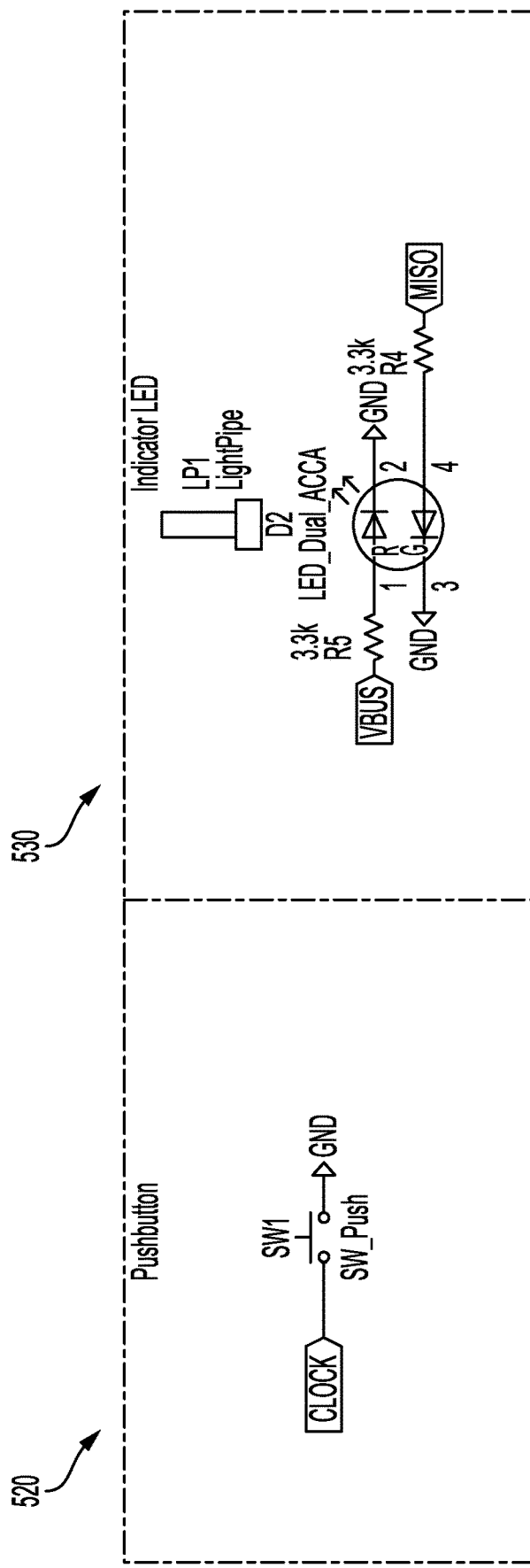

| Ref | Qnty | Value | Footprint | MPN |
|---|---|---|---|---|
| C1, C2 | 2 | 100n | Capacitor_SMD:C_0402_1005Metric | 04025C104KAT2A |
| C3 | 1 | 47u | Capacitor_SMD:C_0805_2012Metric | 08056D476MAT2A |
| C5 | 1 | 1u | Capacitor_SMD:C_0402_1005Metric | C0402B105K016T |
| D2 | 1 | LED_Dual_ACCA | M6KiCadLib:APHBM2012LSURKZGKC | APHBM2012LSURKZGKC |
| FB1 | 1 | Ferrite_Bead_Small | Resistor_SMD:R_1206_3216Metric | MFBW1V3216-150-R |
| J1 | 1 | USB_A | M6KiCadLib:SAMTEC_USB-A-S-X-X-SM2 | USB-A-S-S-W-SM2-TR |
| J2 | 1 | USB_B_Micro | Connector_USB:USB_Micro-B_Molex_47346-0001 | 473460001 |
| Q1 | 1 | SI2369BDS-T1-GE3 | Package_TO_SOT_SMD:SOT-23 | SI2369BDS-T1-GE3 |
| R1 | 1 | 10k | Resistor_SMD:R_0402_1005Metric | RMCF0402FT10K0 |
| R2, R8 | 2 | 100k | Resistor_SMD:R_0402_1005Metric | RMCF0402JT100K |
| R3, R6 | 2 | 1k | Resistor_SMD:R_0402_1005Metric | CR0402AFX-1001GLF |
| R4, R5 | 2 | 3.3k | Resistor_SMD:R_0402_1005Metric | RMCF0402FT3K30 |
| R7 | 1 | 25m | Resistor_SMD:R_1206_3216Metric | ERJ-8CWFR025V |
| SW1 | 1 | SW_Push | M6KiCadLib:PTS815SJG250SMTRLFS | PTS815SJG250SMTRLFS |
| U1 | 1 | ATtiny85V-10MU | Package_DFN_QFN:QFN-20-1EP_4x4mm_P0.5mm_EP2.6x2.6mm | ATtiny85V-10MU |
| U4 | 1 | INA183A3IDBVR | Package_TO_SOT_SMD:SOT-23-5 | INA183A3IDBVR |

FIG. 6

AUTOMATIC PERIPHERAL DEVICE DISCONNECTION

CROSS-REFERENCE TO RELATED APPLICATIONS

The present application claims priority to U.S. Provisional Application Ser. No. 63/408,294, titled "AUTOMATIC PERIPHERAL DEVICE DISCONNECTION," filed Sep. 20, 2022, the contents of which are incorporated herein by reference in their entirety.

STATEMENT REGARDING GOVERNMENT SUPPORT

This invention was made with U.S. Government support under Agreement No. 89233218CNA000001 awarded by U.S. Department of Energy/National Nuclear Security Administration to Triad National Security LLC. The government has certain rights in the invention.

BACKGROUND

The use of web-based cameras (webcams) and other peripheral devices present security risks due to a variety of reasons, including unsecured peer to peer (P2P) networking, lack of password protection on devices with Universal Plug and Play (UPnP) enabled, and easily guessable default login passwords. Not only can streams from the webcams be accessible, but the webcams or other peripherals can be controlled or used to obtain additional secure information. The inventors have identified a number of deficiencies and problems associated with existing peripheral device connection systems and methodologies. Through applied effort, ingenuity, and innovation, many of these identified problems have been solved by developing solutions that are included in embodiments of the present disclosure, many examples of which are described in detail herein.

SUMMARY

Embodiments provide for automatic disconnection of a peripheral device when a power consumption level of the peripheral device drops below a power consumption cutoff threshold, signifying that the peripheral device is no longer active. In embodiments, an example automatic peripheral device disconnect apparatus includes a first input/output port, a second input/output port, first circuitry configured to detect power consumption by a peripheral device connected to the first input/output port, and second circuitry configured to disable power provided from a computing device connected to the second input/output port to the peripheral device connected to the first input/output power when a detected power consumption by the peripheral device meets or drops below a cutoff threshold associated with the peripheral device. The details of one or more embodiments of the subject matter described in this specification are set forth in the accompanying drawings and the description below.

Other features, aspects, and advantages of the subject matter will become apparent from the description, the drawings, and the claims.

BRIEF DESCRIPTION OF THE DRAWINGS

Figure 1:
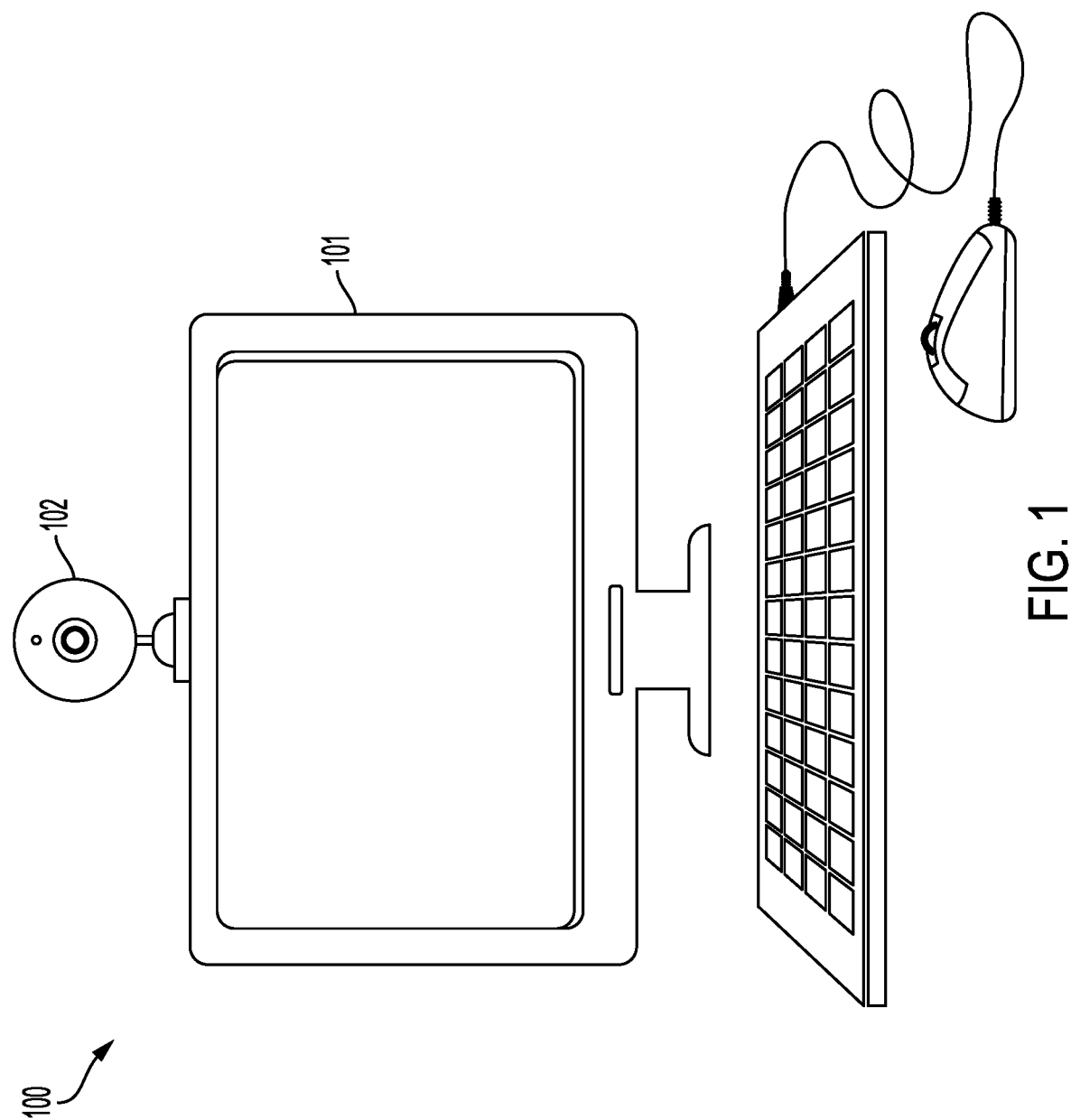

Having thus described the disclosure in general terms, reference will now be made to the accompanying drawings, which are not necessarily drawn to scale, and wherein:

FIG. 1 depicts an example computing system with a peripheral webcam attached thereto.

Figure 2:
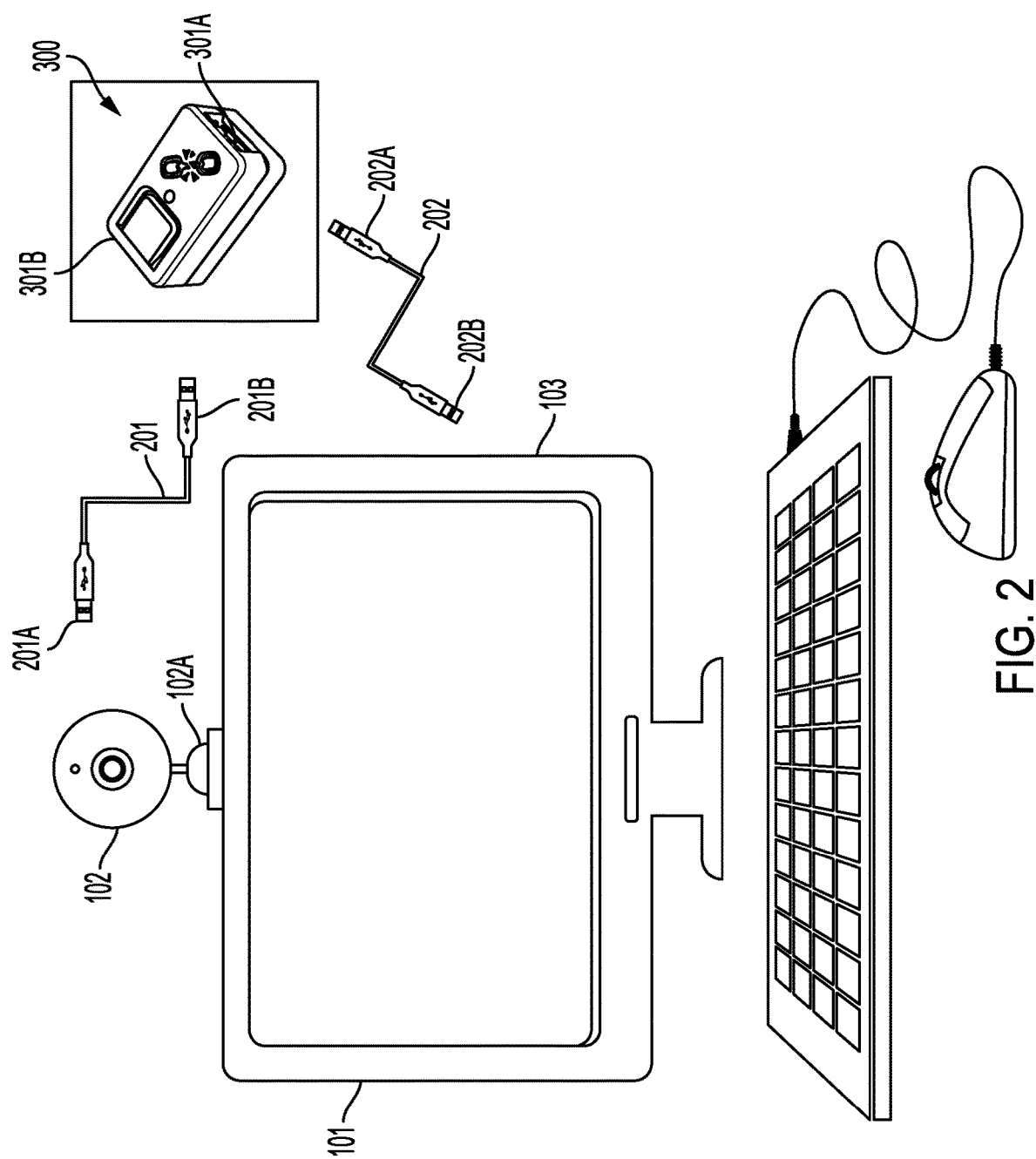

FIG. 2 depicts an example automatic peripheral device disconnect system, according to embodiments of the present disclosure.

Figure 3A:
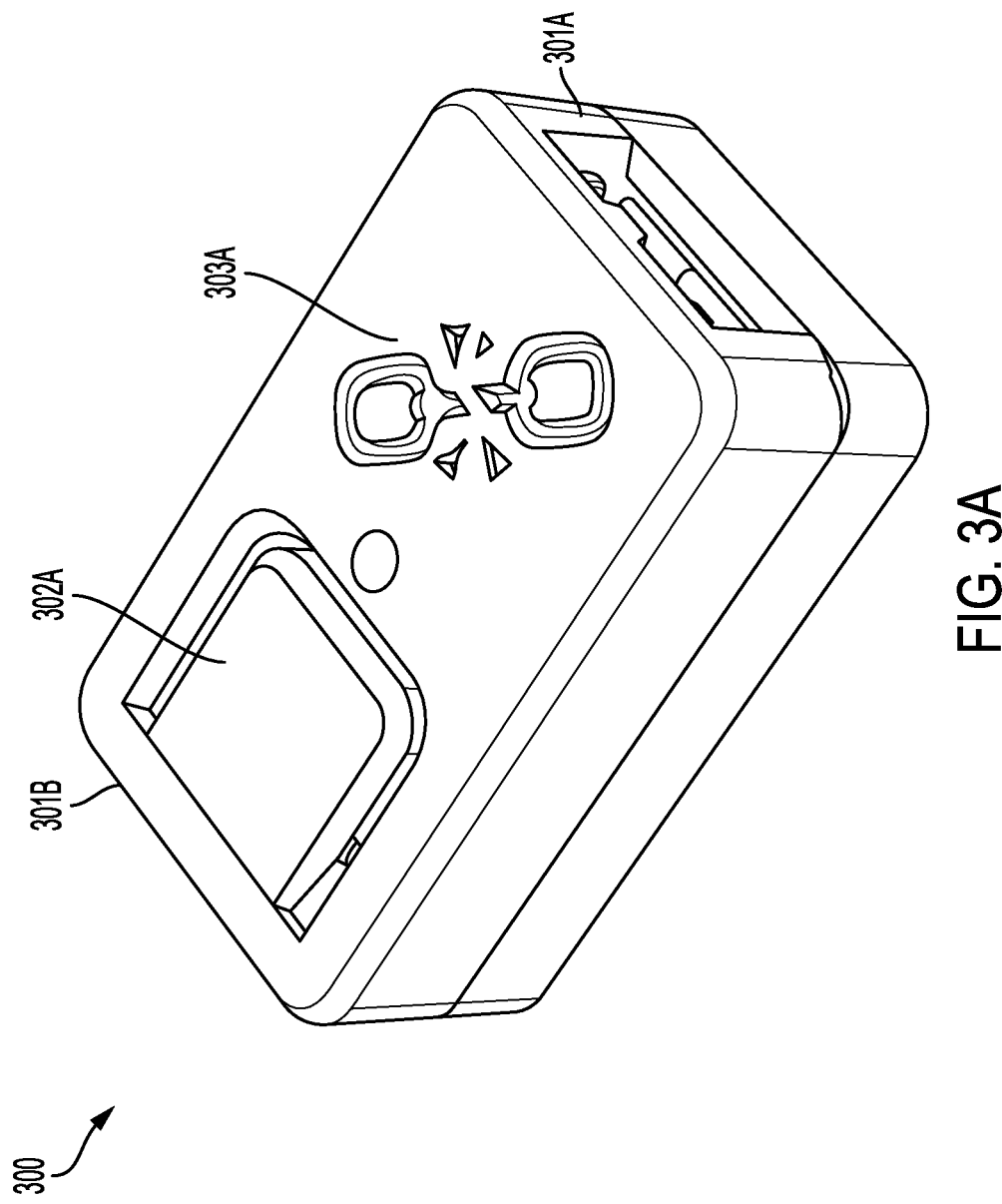

FIG. 3A depicts an example automatic peripheral device disconnect apparatus, according to embodiments of the present disclosure.

Figure 3B:
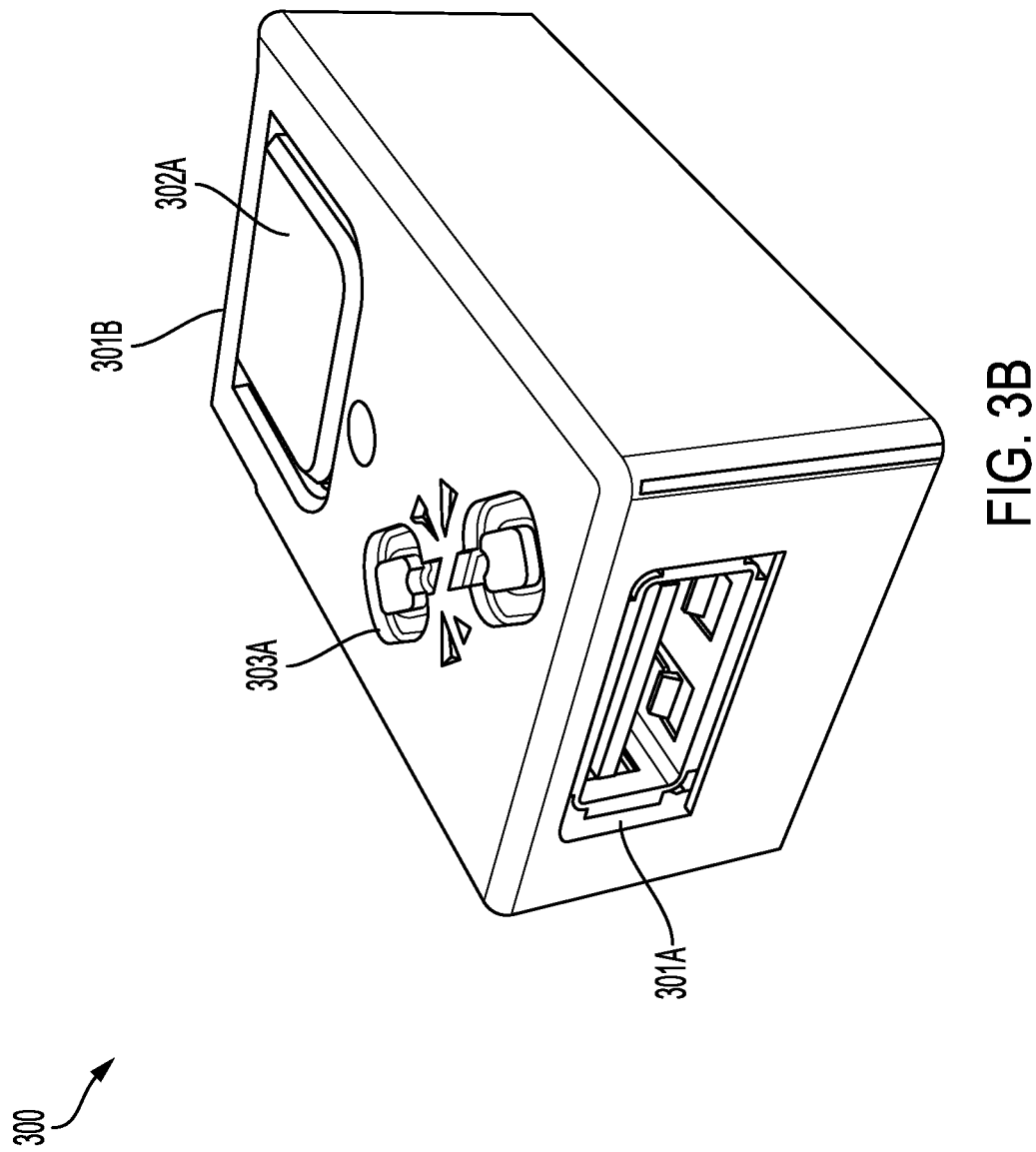

FIG. 3B depicts an example automatic peripheral device disconnect apparatus, according to embodiments of the present disclosure.

Figure 3C:
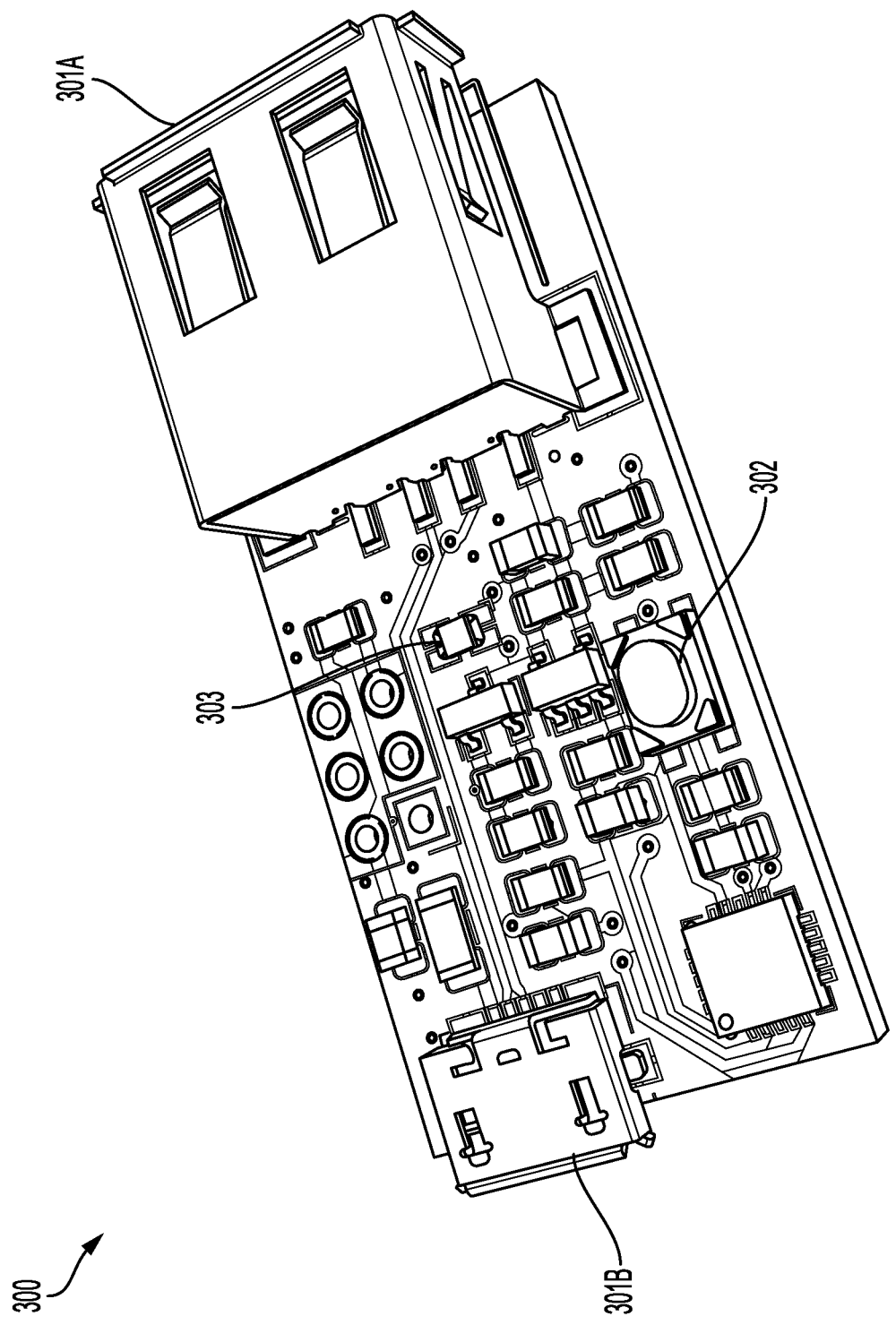

FIG. 3C depicts an example automatic peripheral device disconnect apparatus, according to embodiments of the present disclosure.

Figure 4:
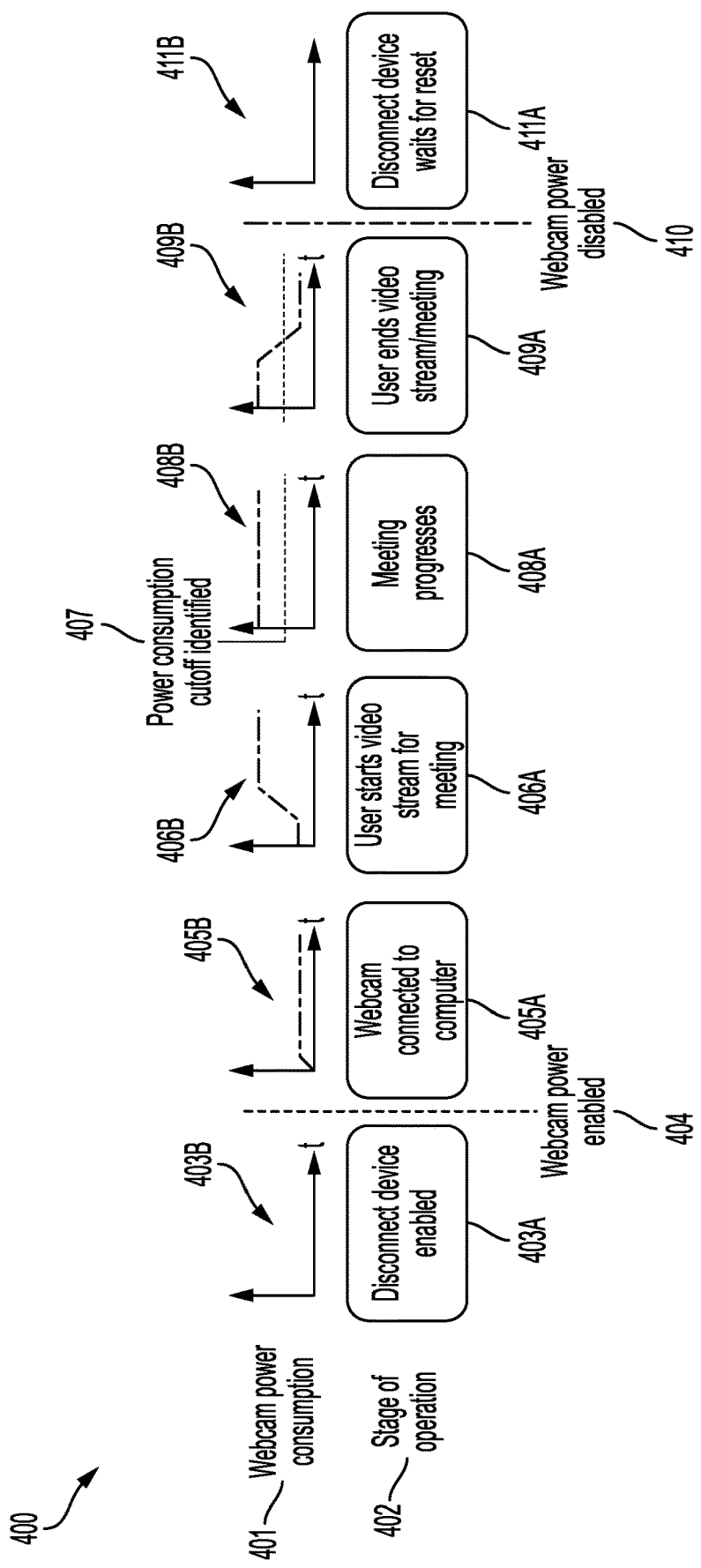

FIG. 4 depicts an example operational flow for an example automatic peripheral device disconnect apparatus, according to embodiments of the present disclosure.

Figure 5A:
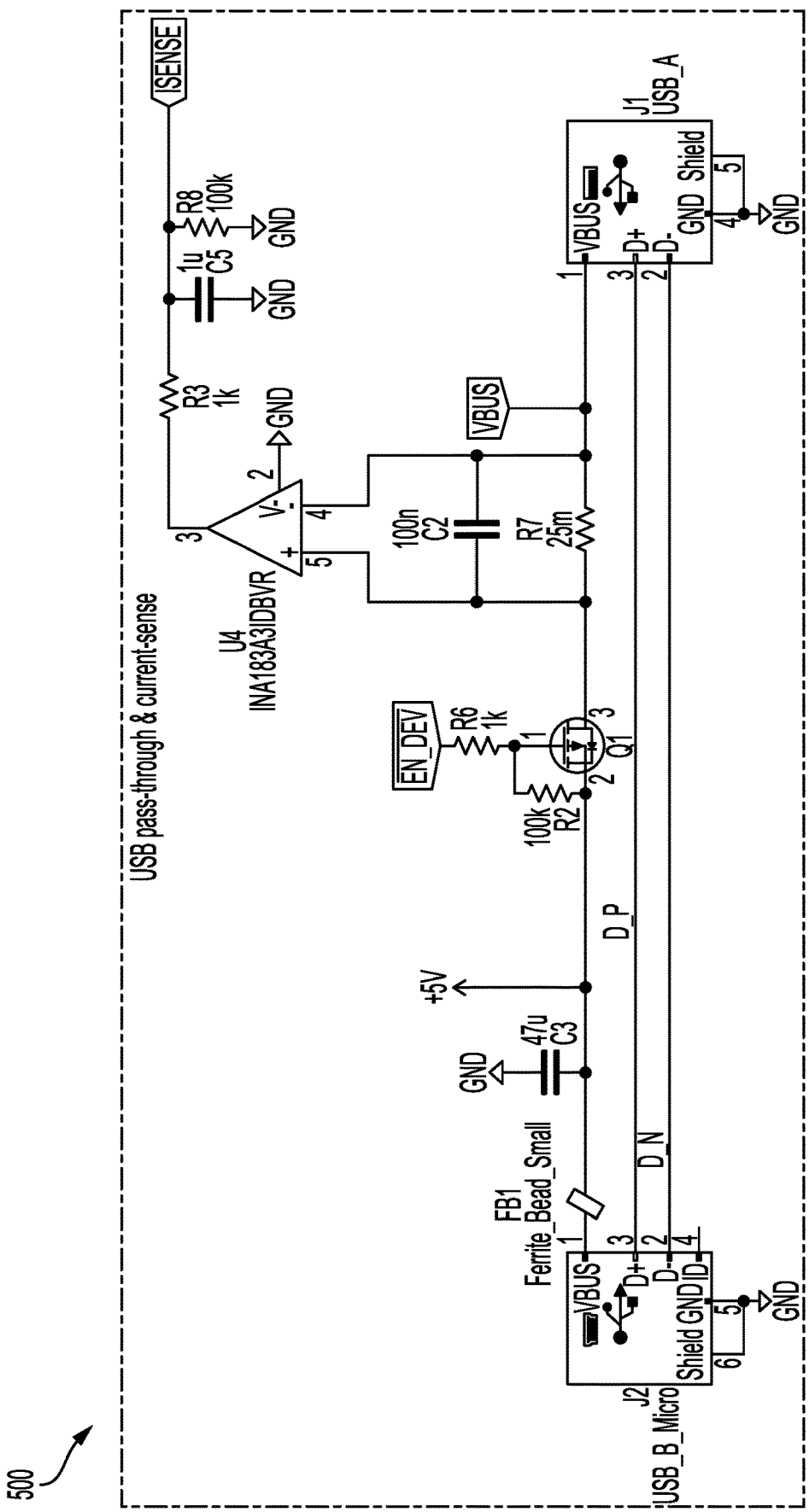

FIG. 5A depicts a schematic of an example pass-through and current-sense circuit for use with embodiments of the present disclosure.

Figure 5B:
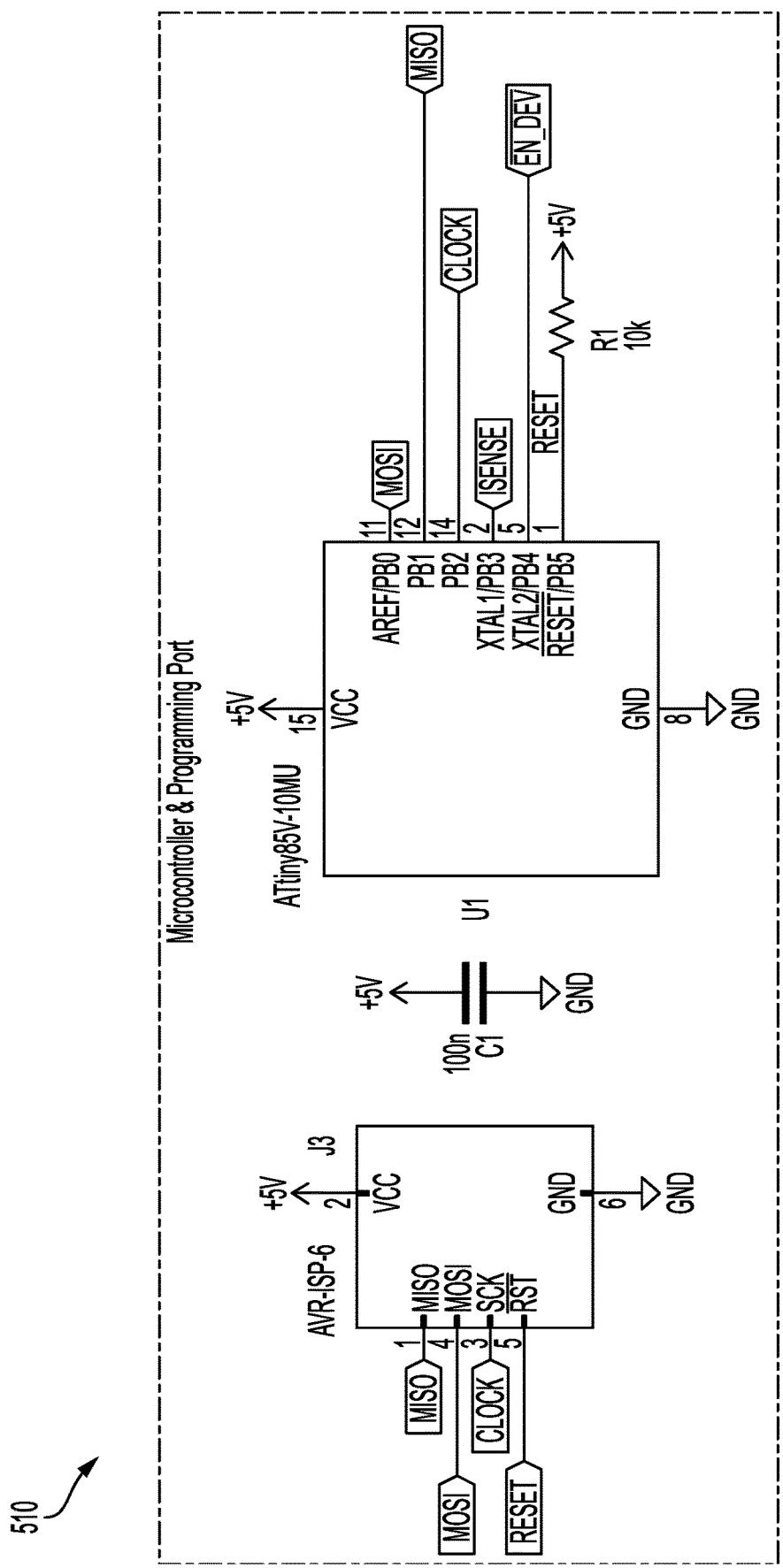

FIG. 5B depicts a schematic of an example microcontroller and programming port circuit for use with embodiments of the present disclosure.

FIG. 5C depicts a schematic of an example pushbutton circuit for use with embodiments of the present disclosure.

FIG. 5D depicts a schematic of an example indicator LED circuit for use with embodiments of the present disclosure.

FIG. 6 depicts an example list of components for use with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Embodiments herein relate to automatically disconnecting a peripheral device based upon a detected drop in power consumption by the peripheral device such that the peripheral device is disabled and cannot be the subject of malicious activities.

A peripheral or a peripheral device is an auxiliary device used for input and output with respect to a computing device. That is, a peripheral device may be a hardware device or component that is attached to a computing device and controlled by the computing device, but is not a core component of the computing device. Peripheral devices may be plugged into a computing device by way of a peripheral port that facilitates communication between the peripheral device and the computing device according to a protocol of the peripheral port. Examples of communication protocols associated with peripheral ports include digital visual interface (DVI), display port, eSATA, PS/2, serial port, VGA, SCSI, USB (including USB 2.0, USB-C, USB 3.0, micro-USB, and the like). In other embodiments, peripheral devices may be directly connected to components of a computing device without use of peripheral ports.

When users connect to computing systems from less than secure environments (e.g., working from home, or otherwise working remotely), any peripheral devices may present a security risk. For example, a user may not remember or elect to disable or unplug a webcam when entering into a classified conversations in a given environment (e.g., when the user is not actively using the webcam). Such a situation may result in a security incident in which the webcam is hacked and used to record or listen to the classified conversation. While alternative solutions, such as webcam covers, have been contemplated, such solutions do not completely disable the webcam device. Therefore, while the webcam cover may eliminate the ability to comprehend a video stream captured by the webcam device, the webcam cover does not eliminate the ability to record an audio stream without the user of the computing device knowing. Embodiments herein eliminate such risks.

Embodiments herein sense an amount of power a peripheral device (e.g., a USB device or other device) is drawing and automatically disconnects the peripheral device from a computing device providing power thereto after a meeting or call has ended (e.g., in the case of a webcam enabled during a video conference meeting or call). In this regard, embodiments herein mitigate or eliminate possible security incidents by automatically disabling the peripheral devices when they are not in use. Embodiments herein further include indicator lights to provide visual indications of a status of the peripheral device (e.g., whether it is active, inactive, enabled, disabled) or the automatic peripheral device disconnect apparatus (e.g., whether it is sensing current or power, or whether it is calibrating). The status of the peripheral device cannot be overridden by malware because the control thereof is associated with hardware herein.

Embodiments herein further provide for a timeout function that will automatically disable a peripheral device in the event a user forgets to close out of a video conference after a meeting has ended (e.g., the peripheral device is still considered active and drawing power although it is not in use).

Embodiments herein leverage the fact that a peripheral device (e.g., a webcam) draws more power when it is active (e.g., in use) than when it is inactive (e.g., idle but receiving power). In embodiments, once a user has enabled a peripheral device via an automatic peripheral device disconnect apparatus (e.g., by way of a pushbutton that turns on the peripheral device, resets the device, or otherwise enables or disables the device), the automatic peripheral device disconnect apparatus may display a particular color (e.g., red or orange) via status indicators (e.g., LEDs), indicating that the automatic peripheral device disconnect apparatus is sensing or measuring how much current (e.g., power) is being drawn by the peripheral device. This level of current draw or power consumption may be used to establish a power cutoff threshold representative of a baseline of power consumption by the peripheral device that is not associated with the peripheral device being actively in use. Thereafter, the automatic peripheral device disconnect apparatus may continuously monitor the power consumption of the peripheral device, waiting to detect a significant falling edge in power consumption. Once the falling edge of power consumption is detected and the power consumption remains at or below the power cutoff threshold for the peripheral device (e.g., indicating the peripheral device is not in active use), the automatic peripheral device disconnect apparatus may disable power to the peripheral device thereby disconnecting the peripheral device from the computing device.

FIG. 1 depicts an example computing system 100 with a peripheral webcam 102 attached thereto. In FIG. 1, computing system 100 includes a computing device 101 (e.g., a laptop computer, a desktop computer, a mobile computing device, or the like). Computing device 101 may have attached thereto a peripheral device (e.g., webcam 102) that is connected to the computing device 101 via a peripheral port (not shown in FIG. 1). Examples of peripheral ports may include USB 2.0, UCB-C, micro-USB ports, and the like. Peripheral device (3.g., webcam 102) may draw power from computing device 101 for operation by way of the peripheral port (not shown in FIG. 1). Accordingly, the peripheral device (e.g., webcam 102) may be constantly enabled or enabled according to a powering scheme dictated by computing device 101 or a user thereof. A peripheral device (e.g., webcam 102) may lead to a reduction of security for computing device 101 and/or a user thereof for a multitude of reasons as described herein.

FIG. 2 depicts an example automatic peripheral device disconnect system, according to embodiments of the present disclosure. In FIG. 2, an automatic peripheral device disconnect system may be incorporated as part of, or connected or connectable to a computing device 101. A user of computing device 101 may wish to attach a peripheral device (e.g., webcam 102) to the computing device 101 for use of the peripheral device (e.g., webcam 102) in conjunction with the computing device 101. Instead of directly connecting the peripheral device (e.g., webcam 102) to the computing device 101 via a peripheral port 103 (e.g., peripheral port 103 can be a USB or other port), an automatic peripheral device disconnect apparatus or device 300 may be connected therebetween. For example, peripheral device (e.g., webcam 102) may be connected by way of a peripheral port 102A thereon, to a first connector 201A of a first connection mechanism 201 (e.g., a USB or other appropriate cable). The connection mechanism 201 may then be connected via a second connector 201B of the connection mechanism to a second connection port 301B of the automatic peripheral device disconnect apparatus 300. The automatic peripheral device disconnect apparatus 300 may then be connected by way of a first connection port 301A of the automatic peripheral device disconnect apparatus 300 to a first connector 202A of second connection mechanism 202 (e.g., a USB or other appropriate cable). The second connection mechanism 202 may then be connected by way of a second connector 202B of the second connection mechanism 202 to a peripheral port 103 of the computing device. It will be appreciated that the automatic peripheral device disconnect apparatus 300 sits between the peripheral device (e.g., webcam 102) and the computing device 101 to enable automatic peripheral device disconnect features described herein. It will be appreciated that ports 102A, 301B, 301A, and 103 can be any combination of USB 2.0, USB 3.0, micro-USB, USB-C, or other appropriate protocol associated with variations of embodiments herein without limitation. In other embodiments, 102A, 301B, 301A may be direct connections and not include the use of peripheral ports. Further, connectors 201A, 201B, 202A, 202B (as well as connection mechanisms 201, 202) can be any combination of connectors appropriate for the particular port protocol, direct connections that do not use any port protocols, or other variations of embodiments herein without limitation.

FIGS. 3A, 3B, and 3C depict an example automatic peripheral device disconnect apparatus 300, according to embodiments of the present disclosure. An example automatic peripheral device disconnect apparatus 300, according to embodiments herein, may have internal circuitry (e.g., shown in FIG. 3C) housed within an exterior housing (e.g., shown in FIGS. 3A and 3B). The exterior housing may include components for user interaction with features enabled by way of the internal circuitry. For example, the exterior housing may include a button or other mechanism 302A for actuating an enable/disable mechanism 302 (e.g., a switch or button or other circuit component) of the internal circuitry. Further, the exterior housing may include a display section 303A corresponding to and enabling display of device status provided by one or more status indicators 303 (e.g., LEDs or other lighting component) of the internal circuitry. The automatic peripheral device disconnect apparatus 300 may also include a first input/output port 301A and a second input/output port 301B for communicating, respectively, with a peripheral device connected thereto as well as a computing device connected thereto. For example, one of the first input/output port 301A or the second input/output port 301B may be connected, by way of a connection mechanism (e.g., a cable with connectors on either ends of the cable) to a computing device (e.g., 101). Continuing with the same example, the remaining input/output port may then be connected to a peripheral device (e.g., 102) so that the peripheral device can communicate with and be powered by the computing device (e.g., 101), via the automatic peripheral device disconnect apparatus. Further, the automatic peripheral device disconnect apparatus may monitor an amount of power drawn by the peripheral device (e.g., 102) and disable power provided thereto according to embodiments herein, when the computing device (e.g., 101) may not have otherwise. The disconnect apparatus described above is merely one example, and in other embodiments, a disconnect apparatus may not include all of the features described, or may include additional features. For example, in some embodiments, the disconnect apparatus may not have a housing and instead be incorporated into a housing of a computer system such as system 100 (FIG. 1). In these embodiments, instead of peripheral ports, the disconnect apparatus may have direct connections to the peripheral device and the computing system.

The status indicators herein may, in certain embodiments, indicate a first status of a peripheral device that is "disconnected" using a green color. The status indicators herein may, in certain embodiments, indicate a second status of a peripheral device that is "connected" using a red color. The status indicators herein may, in certain embodiments, indicate a status of the automatic peripheral device disconnect apparatus that is "calibrating" using an orange or red/green color. It will be appreciated that the various indications and colors described herein are not intended to be limiting.

It will be appreciated that, while the example device 300 depicted in FIG. 3C includes a micro-USB port 301B and a USB 2.0 port 301A, any combination of protocols can be enabled by way of the input/output ports to be within the scope of the present disclosure.

FIG. 4 depicts an example operational flow 400 for an example automatic peripheral device disconnect apparatus (e.g., 300), according to embodiments of the present disclosure. In FIG. 4, the operational flow 400 of the automatic peripheral device disconnect apparatus monitors peripheral device (e.g., webcam) power consumption 401 during various stages of operation 402. In an example use case involving a video conference meeting, in a first stage of operation, a disconnect device state of the automatic peripheral device disconnect apparatus may be enabled in an operating stage 403A, and in such a state the webcam can be seen as not consuming any power in corresponding plot 403B. Once the webcam power is enabled 404, the webcam is connected to the computing device in an operating stage 405A. In such an operating stage (e.g., 405A), the webcam can be seen as consuming a first level of power in plot corresponding 405B. Once streaming of video begins in the video conference, in an operating stage 406A, the power consumption of the webcam can be seen as increasing in corresponding plot 406B. During a further operating stage 408A, the video conference is shown as continuing and the webcam power consumption is shown as consistent in corresponding plot 408B. It will be appreciated that a power consumption cutoff 407 can be identified based upon comparing a first power consumption level associated with the webcam being connected to the computing device but not activated for use (e.g., operating stage 405A) and a second power consumption level associated with the webcam being activated for use during a video conference (e.g., in operating stages 406B and 408B).

When, in an operating stage 409A, the user ends the video conference (e.g., video streaming ceases) and the webcam is no longer activated for such use, the power consumption of the webcam is shown as having dropped in corresponding plot 409B. Because the power consumption dropped below the power consumption cutoff 407, the automatic peripheral device disconnect apparatus may detect such a power consumption drop and determine that the webcam is no longer in use. Accordingly, the automatic peripheral disconnect apparatus may disable power 410 to the webcam. The disconnected device may then wait for a reset in an operating stage 411A, and is shown to draw zero or negligible power in corresponding plot 411B.

Other embodiments provide for additional steps and/or logic that account for variations in power consumption that may occur when used with different webcams, of different quality or characteristics, when idle, and different amounts of power when active due to different streaming resolutions, lighting conditions, image sensors, and internal hardware. Power consumption may not be constant as there may be small spikes and momentary dips (glitches) in supplied current when webcams are activated for streaming or deactivated. Embodiments provide for logic that actively adapts to the different power consumption of different webcams, and does not incorrectly disconnect the webcam when momentary (measured in milliseconds) power glitches occur.

To address the above issues, some embodiments implement a dynamic cutoff threshold based on one or more sample measurements of power consumption. In one embodiment, an averaged window of webcam power samples may be calculated and the cutoff threshold for disconnecting set to half an averaged value. For example, the webcam may be consuming 100 mA of current over an averaging window, the cutoff threshold may then be set to 50 mA. In this example, when a webcam current drops below 50 mA suddenly (indicating an end to a video stream) the device disconnects. As the cutoff is determined with a windowed average, changes in webcam power consumption over time are accounted for (e.g., lighting changes in the video stream) using these embodiments. These embodiments provide very robust detection that automatically scales/adapts to different webcams and different webcam use cases in real time.

Other embodiments provide for avoiding false disconnects by providing some hysteresis in the disconnecting logic. When embodiments of a device detects a power drop below the cutoff threshold it watches for several subsequent measurements to also be below the cutoff level before disconnecting. With the time between measurements of webcam power being tens of milliseconds, these embodiments adequately filter out any momentary power glitches and suppresses unintended disconnect events.

The combination of these two approaches allows embodiments of the disconnect device/method to work with any number of webcams reliably (as well as other peripheral devices) and provides significant advantages over exiting methods or devices.

FIG. 5A depicts a schematic of an example pass-through and current-sense circuit 500 for use with embodiments of the present disclosure. In FIG. 5A, an example pass-through and current-sense circuit 500 includes a first circuit for communication via a first input/output port (e.g., "USB_B_Micro" in FIG. 5A) as well as a second circuit for communication via a second input/output power (e.g., "USB_A" in FIG. 5A). The example circuit 500 further includes a current-sense circuit for detecting power consumption by a peripheral device connected to one of the input/output ports. The example circuit 500 is also configured to control (e.g., enable or disable) power to the peripheral device based upon the detected power consumption, where the power is provided via the example circuit 500 to the peripheral device from the computing device connected to the other input/output port.

FIG. 5B depicts a schematic of an example microcontroller and programming port circuit 510 for use with embodiments of the present disclosure. In FIG. 5B, an example microcontroller and programming port circuit 510 includes circuitry configured to receive signals from and provide signals to the current-sense circuitry (e.g., of 500) for enabling or disabling a connected peripheral device based on detected power consumption of the peripheral device.

FIG. 5C depicts a schematic of an example pushbutton circuit 520 for use with embodiments of the present disclosure. The example pushbutton circuit 520 (e.g., corresponding in some embodiments to button 302) comprises a switch for manually disabling, enabling, or resetting a connected peripheral device by way of the automatic peripheral device disconnect apparatus.

FIG. 5D depicts a schematic of an example indicator LED circuit 530 for use with embodiments of the present disclosure. The example indicator LED circuit 530 (e.g., corresponding in some embodiments to indicator(s) 303) comprises one or more LEDs and circuitry configured to display a device status as dictated by the microcontroller and programming port circuit 510.

FIG. 6 depicts an example list of components for use with embodiments of the present disclosure. Shown in FIG. 6, an example automatic peripheral device disconnect apparatus may include multiple capacitors (e.g., C1, C2, C3, C5), one or more LEDs (e.g., D2), multiple resistors (FB1, R1, R2, R8, R3, R6, R4, R5, R7), multiple jumpers or connectors (e.g., J1, J2, USB_A, USB_B_Micro), one or more transistors (e.g., Q1), one or more switches (e.g., SW1), one or more microcontrollers (e.g., U1) and one or more current sense amplifiers (e.g., U4). While the example list of components depicted in FIG. 6 includes specific details with respect to an implementation of embodiments herein, it will be appreciated that FIG. 6 is not intended to be limiting and circuitry configured to enable the features described herein is within the scope of the present disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An automatic peripheral device disconnect apparatus, comprising:
a first input/output connection;
a second input/output connection;
first circuitry configured to detect power consumption by a peripheral device connected to the first input/output connection;
second circuitry configured to, responsive to receiving a signal from the first circuitry indicating that power consumption by the peripheral device is at a level below a cutoff threshold, disable power provided from a computing device connected to the second input/output connection to the peripheral device; and
one or more status indicators, comprising at least one LED, configured to provide visual indication of a status of the peripheral device, wherein the status of the peripheral device is one of measuring current or calibrating.

2. The automatic peripheral device disconnect apparatus of claim 1, wherein the first circuitry is configured to detect a first power consumption level associated with power consumed by the peripheral device when it is receiving power but is not in active use, and wherein the cutoff threshold is defined at least in part on the first power consumption level.

3. The automatic peripheral device disconnect apparatus of claim 1, wherein the first circuitry is configured to detect a second power consumption level associated with power consumed by the peripheral device when it is receiving power and is in active use.

4. The automatic peripheral device disconnect apparatus of claim 1, wherein the status of the peripheral device is one of active or inactive.

5. The automatic peripheral device disconnect apparatus of claim 1, further comprising an actuatable switch that, when actuated, disables power to the peripheral device.

6. The automatic peripheral device disconnect apparatus of claim 5, wherein the actuatable switch is responsive to a physical pushbutton.

7. The automatic peripheral device disconnect apparatus of claim 1, wherein the peripheral device is a webcam.

8. The automatic peripheral device disconnect apparatus of claim 1, wherein the first input/output connection or the second input/output connection comprises a micro-USB port.

9. The automatic peripheral device disconnect apparatus of claim 1, wherein one or more of the first input/output connection or the second input/output connection comprises a USB 2.0 port.

10. The automatic peripheral device disconnect apparatus of claim 1, wherein one or more of the first input/output connection or the second input/output connection comprises a USB-C port.

11. The automatic peripheral device disconnect apparatus of claim 1, where the cutoff threshold is dynamically determined.

12. The automatic peripheral device disconnect apparatus of claim 11, wherein the cutoff threshold is determined based at least in part on one or more samples of the power consumption of the peripheral device.

13. The automatic peripheral device disconnect apparatus of claim 1, wherein the second circuitry disables power only after at least one subsequent detection of power consumption by the first circuitry below the cutoff threshold.

14. The automatic peripheral device disconnect apparatus of claim 1, wherein the first circuitry comprises current sensing circuitry.

15. The automatic peripheral device disconnect apparatus of claim 1, wherein the second circuitry comprises one or more microcontrollers for receiving signals from and providing signals to the first circuitry.

16. The automatic peripheral device disconnect apparatus of claim 1, wherein the second circuitry is configured to automatically disable power provided from the computing device connected to the second input/output connection to the peripheral device connected to the first input/output connection after a time out duration has expired.

17. An automatic peripheral device disconnect apparatus, comprising:
    a first input/output connection;
    a second input/output connection;
    first circuitry configured to detect power consumption by a peripheral device connected to the first input/output connection;
    second circuitry configured to disable power provided from a computing device connected to the second input/output connection to the peripheral device connected to the first input/output connection when the power consumption is detected, by the first circuitry, at a level below a cutoff threshold; and
    one or more status indicators, comprising at least one LED, configured to provide visual indication of a status of the peripheral device, wherein the status of the peripheral device is one of measuring current or calibrating.

18. The automatic peripheral device disconnect apparatus of claim 17, wherein the first circuitry is configured to detect a first power consumption level associated with power consumed by the peripheral device when it is receiving power but is not in active use, or wherein the first circuitry is configured to detect a second power consumption level associated with power consumed by the peripheral device when it is receiving power and is in active use.

19. The automatic peripheral device disconnect apparatus of claim 17, wherein the first input/output connection or the second input/output connection comprises a micro-USB port, a USB 2.0 port, or a USB-C port.

20. The automatic peripheral device disconnect apparatus of claim 17, wherein the second circuitry is configured to automatically disable power provided from the computing device connected to the second input/output connection to the peripheral device connected to the first input/output connection after a time out duration has expired.

* * * * *

UNITED STATES PATENT AND TRADEMARK OFFICE
CERTIFICATE OF CORRECTION

PATENT NO. : 12,416,966 B1  
APPLICATION NO. : 18/471075  
DATED : September 16, 2025  
INVENTOR(S) : Farnsworth et al.

Page 1 of 1

It is certified that error appears in the above-identified patent and that said Letters Patent is hereby corrected as shown below:

On the Title Page

Item (73) Assignee, Please change "Triad National Security, LLC, Los Alamos, TX (US)" to -- -Triad National Security, LLC, Los Alamos, NM (US)--.

Signed and Sealed this  
Twenty-seventh Day of January, 2026

John A. Squires  
*Director of the United States Patent and Trademark Office*